United States Patent [19]
Bock et al.

[11] Patent Number: 5,765,358
[45] Date of Patent: Jun. 16, 1998

[54] BEARING FOR AN OPEN-END SPINNING DEVICE

[75] Inventors: Erich Bock, Wettstetten; Manfred Knabel; Edmund Schuller, both of Ingolstadt, all of Germany

[73] Assignee: Rieter Ingolstadt Spinnereimaschinenbau AG. Ingolstadt, Germany

[21] Appl. No.: 878,898

[22] Filed: Jun. 19, 1997

[30] Foreign Application Priority Data

Jul. 27, 1996 [DE] Germany .................. 196 30 477.6

[51] Int. Cl.⁶ ........................................ D01H 4/00
[52] U.S. Cl. ........................... 57/406; 57/404; 384/279; 384/902
[58] Field of Search ................. 384/902, 279, 384/121; 57/404, 406

[56] References Cited

U.S. PATENT DOCUMENTS

| | | | |
|---|---|---|---|
| 3,813,133 | 5/1974 | Walter et al. | 308/9 |
| 4,095,552 | 6/1978 | Lo . | |
| 4,744,676 | 5/1988 | Lind | 384/115 |
| 4,838,710 | 6/1989 | Ohta et al. | 384/100 |
| 5,098,205 | 3/1992 | Zehndbauer et al. . | |
| 5,450,718 | 9/1995 | Knabel et al. . | |
| 5,451,110 | 9/1995 | Gams, Jr. et al. . | |

FOREIGN PATENT DOCUMENTS

| | | |
|---|---|---|
| 0190440 | 8/1986 | European Pat. Off. . |
| 0435016A2 | 7/1991 | European Pat. Off. . |
| 3942612A1 | 6/1991 | Germany . |
| 4316170C1 | 11/1994 | Germany . |

OTHER PUBLICATIONS

German Patent Office Search Report, Dec. 23, 1996.
U.S. patent application Ser. No. 08/878.897.

*Primary Examiner*—William Stryjewski
*Attorney, Agent, or Firm*—Dority & Manning

[57] ABSTRACT

An aerostatic axial bearing (6) of an open-end spinning machine in which the bearing plate (601) of the axial bearing (6) is made of a permeable material, has a bearing plate (601) provided with one or several air channels (605), the task of which is to convey the air closer to the bearing gap (630) before it goes through the permeable bearing plate material. Thereby, the utilization of an additional choke can be avoided. Furthermore the mechanical properties of the holder bearing plate (601) are improved.

7 Claims, 3 Drawing Sheets

BEARING FOR AN OPEN-END SPINNING DEVICE

BACKGROUND OF THE INVENTION

The present invention relates to an aerostatic bearing for an open-end spinning device with a spinning rotor.

EP 0 435 016 A2 discloses an open-end spinning device of this type, in which the spinning rotor is supported in bearing disks and where an axial force is exerted upon the spinning rotor via the bearing disks, whereby the spinning rotor bears via its shaft axially upon an aerostatic axial bearing. This bearing is provided with a bearing plate which interacts with the end of the rotor shaft. The air flows out from the bearing plate into the bearing gap, so that an air cushion forms between the rotor shaft and the baring plate. The bearing plate of the axial bearing of the known open-end spinning device is made of a permeable material so that the air outflow into the bearing gap takes place directly through the bearing plate. The material is in that case advantageously a carbon material which is formed by a kind of sintering into the bearing plate. The bearing plate constitutes at the same time and in a known manner a choke for the air, so that the axial bearing can be made rigid. In the known bearing system, in which the bearing plate is at the same time the choke for the compressed air, the disadvantage exists however that the bearing plate cannot be designed freely, as otherwise the choke effect in the bearing plate is too great and not enough air can go through the choke and into the bearing gap. This disadvantage could be compensated for in that the bearing plate can be supplied with compressed air under very high pressure. This compressed air is however not available in most instances. Another disadvantage of the known device is that when a bearing plate is used in which the air put-through and the pressure conditions are favorable, the bearing plate itself lacks however sufficient mechanical strength because of its small axial extension. This may lead to damage to or destruction of the bearing during operation. Since the bearing plate must be seated in a seat, e.g. by pressing it into the seat, a bearing plate with little mechanical stability can be damaged or destroyed even during assembly. The method of providing part of the bearing plate with a choke that is combined with it and is located in a top-shaped cavity is know from the state of the art. Although stability for assembly of the bearing plate can be improved by this additional measure, the overall bearing plate becomes however much more expensive to produce.

An open-end spinning device with shaft-less spinning rotor of similar type is known from EP 0 190 440 A2, in which the spinning rotor is supported directly on a bearing plate of an aerostatic axial bearing. Here too the above-mentioned disadvantages are present.

OBJECTS AND SUMMARY OF THE INVENTION

It is a principal object of the present invention to design an open-end spinning device with a bearing plate for an aerostatic axial support of its open-end spinning rotor in such a manner that no additional choke is required, and that the bearing plate ensures sufficient air passage in the bearing gap and is at the same time mechanically stable. Additional objects and advantages of the invention will be set forth in part in the following description, or will be obvious from the description, or may be learned through practice of the invention.

The design of the open-end spinning device according to the invention ensures that the axial bearing can be made simply because an additional choke can be dispensed with. The bearing plate itself, which is permeable, acts at the same time as a choke for the arrival of compressed air. Here, the air channels according to the invention make it possible that the air through-put through the bearing plate can be controlled easily by the thickness of the material to be traversed by the air. This is done in that the air channels end in the bearing plate at a lesser or greater distance from the bearing surface. At the same time the result is that the bearing plate itself can be mad so as to be a compact, stable component which is mechanically resistant so that it can be received in a seat, e.g. by being pressed into it, and at the same time so that the supported part cannot be destroyed by mechanical contact. The throttling effect can be adjusted easily by the wall thickness between the end of the air channels and the bearing surface. This makes it possible to use also different materials for the bearing plate without changing the design. Only the depth of the air channels or their distance from the bearing surface make it possible to adjust the air through-put amount for the bearing plate. No special requirements are necessary for the pressure conditions of the compressed-air connection. Depending on the material of the bearing plate, it is advantageous to let the air channels end at a distance of 0.5 mm to 4 mm from the bearing surface. At least three air channels are advantageously used, so that a uniform air input into the bearing gap can be ensured. It is especially advantageous if the number of air channels is between 6 and 13. If fewer channels are present, it may be advantageous for them to touch each other or to overlap each other in part. It is only important that, in the final effect, mechanical stability, in particular at a right angle to the axis of the air channels, be achieved. In another advantageous embodiment of the invention, the air channels have a diameter between 1.5 and 4 mm. With a smaller diameter more channels can be provided in the bearing plate, so that an advantageous distribution of air is achieved in the bearing gap. With a diameter of approximately 4 mm in the air channel, and in spite a low number of bores, these can be made rapidly and easily and sufficient air distribution in the bearing can be achieved. The air channels are advantageously from 0.5 mm to 5 mm long, so that the air through-put or the choke effect of the bearing plate can be controlled by the depth of the air channels while sufficient strength of the bearing plate is ensured. It is especially advantageous to place the air channels symmetrically in the bearing plate. This is especially advantageous for the air distribution in the bearing gap. Here it is especially advantageous to distribute the air channels over one or several circular lines around the rotational axis of the spinning rotor or around the center of the bearing plate, as well as to provide an air channel in the center itself.

The invention is described below through drawings.

3

Figure 5A:
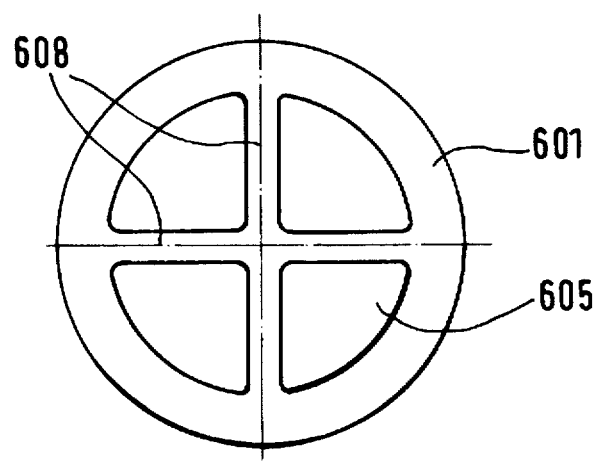

FIG. 5a shows a rear top view of a bearing plate; and

Figure 5B:
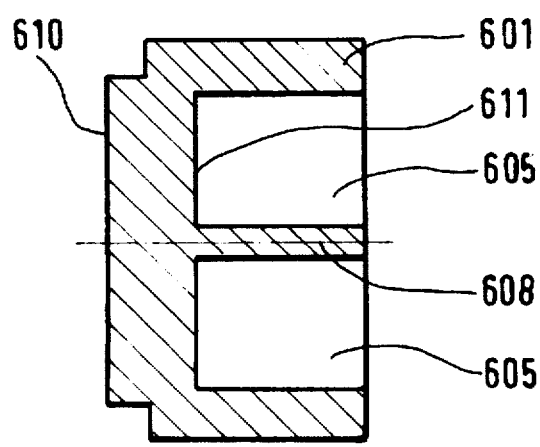

FIG. 5b shows a side view of the bearing plate of FIG. 5a in a section.

DETAILED DESCRIPTION OF THE PREFERRED EMBODIMENTS

Reference will now be made in detail to the presently preferred embodiments of the invention, one or more examples of which are illustrated in the drawings. Each example is provided by way of explanation of the invention, and not meant as a limitation of the invention. In fact, features illustrated or described as part of one embodiment can be used on another embodiment to yield a still further embodiment. It is intended that the present invention cover such modifications and variations that come within the scope of the appended claims and their equivalents.

Figure 1:
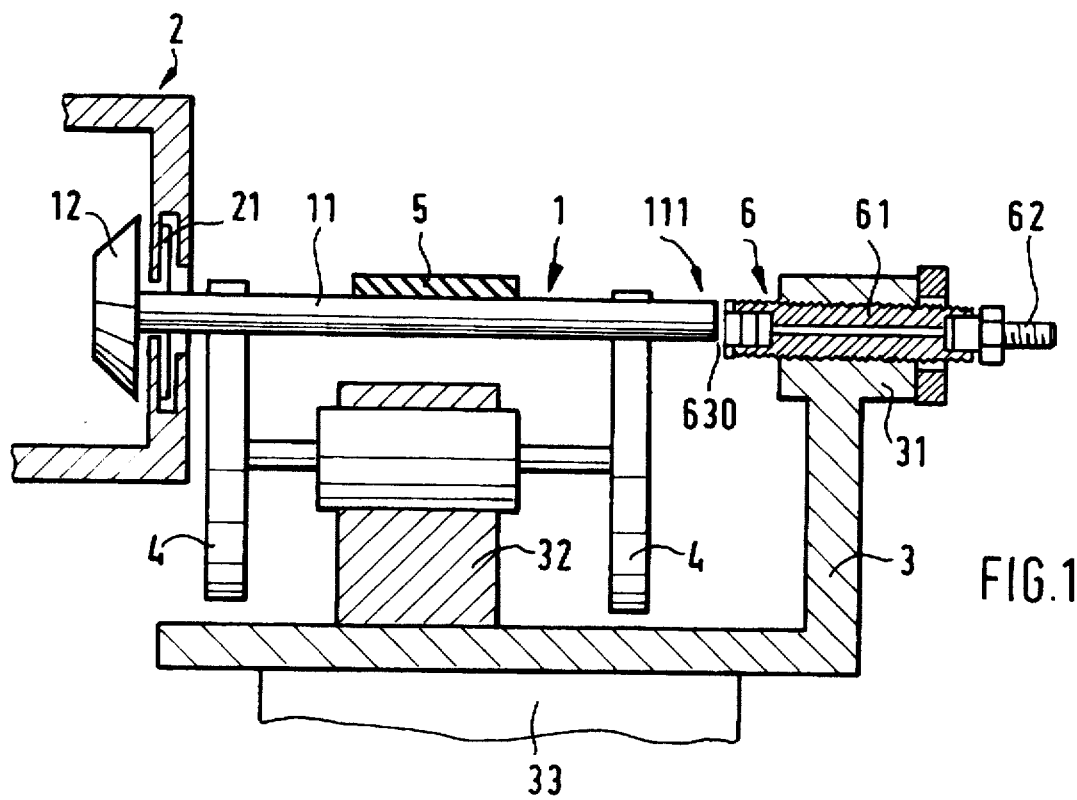
FIG. 1 shows an open-end spinning device according to the invention in a section.

FIG. 1 shows an open-end spinning device designed according to the invention, in a section. Here an example is described in which the spinning rotor is supported via a shaft. The essential components of such an open-end spinning device are the spinning rotor 1 with its shaft 11 and the rotor plate 12, the rotor housing 2 with the rotor housing seal 21, the bearing block 3 with the bearing seat 31 of the axial bearing 6 and with a seat 32 to support the bearing disks 4, the bearing disks 4 to receive the rotor shaft, the drive means 5, for example a tangential belt to drive the spinning rotor 1, and the axial bearing 6 for axial support of the shaft 11.

The shaft 11 reaches with its end supporting the rotor plate 12 through the rotor housing seal 21 into the rotor housing 2.

The axial bearing 6 is held in a holder 61 which, as shown in FIG. 1, is in form of an adjusting screw. The axial bearing 6 is across from the free end 111 of the shaft 11. The bearing seat 31 is provided with a threaded bore into which the adjusting screw is screwed adjustably. To set it, a counter nut is used. On the end of the adjusting screw away from the axial bearing 6, the connection 62 for the arrival of compressed air to the axial bearing 6 is located. The bearing gap 630 extends between the axial bearing 6 and the free end 111. An axial force which is supported on an axial bearing is brought to bear in a known manner on open-end spinning devices of similar type. It is however also just as possible to apply the axial force component e.g. via a drive belt which is at an angle to the rotor shaft, or also via a pressure or driving disk placed at an angle or, as e.g. in the open-end spinning device of EP 0 190 440 A2, via magnetic forces. The open-end spinning device is attached on a support 33 which is part of the appertaining spinning machine.

Figure 2:
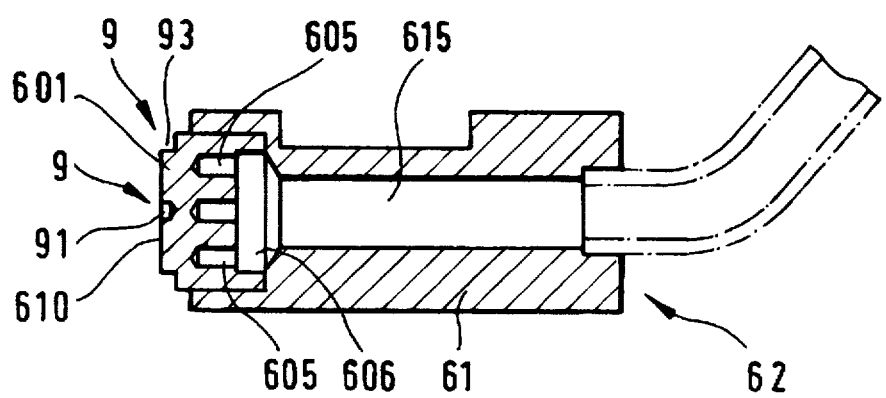
FIG. 2 shows an axial bearing made according to the invention and placed in a holder.

FIG. 2 shows a holder 61 with an axial bearing 6. The holder is not made in the form of an adjusting screw as in FIG. 1, but is attached through clamping means (which are not shown) to the bearing seat. The bearing plate 601 of the axial bearing 6 is made so as to be permeable to compressed air, so that no bores are needed in order to guide the compressed air directly into the bearing gap of the axial bearing 6. To ensure that the air is not excessively throttled as it passes through the bearing plate, the bearing plate 601 is provided with air channels 605 drilled into the side of said bearing plate 601 away from the shaft so that the compressed air can be brought closer to the running surface 610 of the bearing plate 601. The air need not flow through the entire length of the bearing plate 601 in channels. Thereby a sufficient amount of compressed air reaches the bearing gap. The design of the bearing plate 601 according to the invention, with the air channels 605 extending in the axial direction, makes it possible to omit a throttling arrangement,

4 and the bearing plate 601 is at the same time sufficiently large in axial direction so that it can be pressed into the holder 61 without any danger that the bearing plate may be damaged or destroyed in this process. On its end away from the bearing plate 601, the holder 61 is provided with a connection 62 for compressed air, with which the bearing plate 601 is connected via a bore 615 of the holder 61. The bearing plate 601 is provided with two wear indicators 9 of which one is made in the form of a blind bore 91 and the other in the form of an extension 93. In case of wear of the bearing plate 601, the change can be perceived optically by a maintenance person.

Figure 3A:
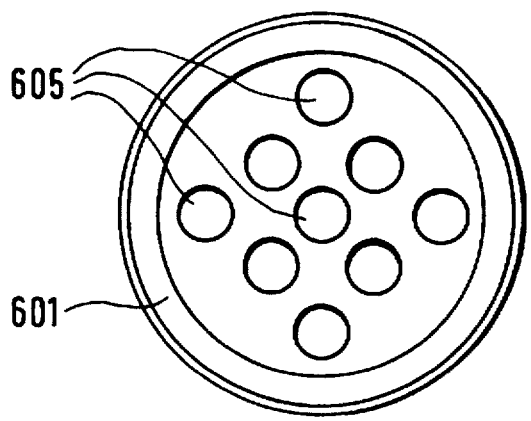
FIG. 3a shows a top view of the side of the bearing plate of FIG. 2 away from the spinning rotor.

FIG. 3a shows the bearing plate 601 of FIG. 2 in a top view on the side away from the running surface 610. The air channels 605, by means of which the compressed air can be conveyed deep into the bearing plate 601, can be seen in this view from the top. In the present case there are nine bores arranged symmetrically, with four and four placed at the same distance from each other along circular lines. The ninth bore is located in the center of the bearing plate. Thanks to this configuration, the bearing plate 601 can be made so as to be especially stable mechanically. The radial strength of the bearing plate 601 is barely reduced by the air channels 605. At their end away from the running surface 610 the air channels 605 merge into a joint air channel in the form of a recess 606 in the bearing plate 601.

Figure 3B:
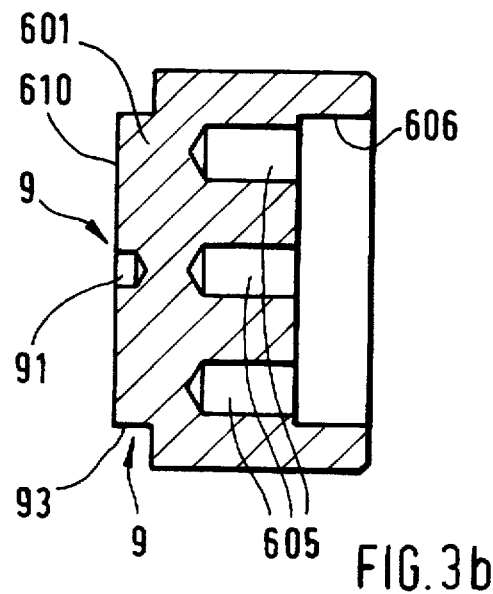
FIG.3b shows a side view of the bearing plate of FIG. 3a, in a section.

FIG. 3b shows the left side view of the bearing plate 601 of FIG. 3a in a section. The running surface 610 is provided with a centered wear indicator 9 and also with the extension 93 which constitutes a second wear indicator 9. By their depth the air channels 605 in the bearing plate 601 ensure a sufficient air through-put through the bearing plate 601. The distance between the end of the air channels 605 and the running surface 610 determines the passage of air through the bearing plate 601. The ring-shaped portion of the bearing plate 601 which surrounds the recess 606 is of no consequence to the mechanical strength of the bearing plate 601 if it serves essentially to render the bearing plate easier to handle thanks to the longer axial extension of the bearing plate and not to press the bearing plate into a seat.

Figure 4A:
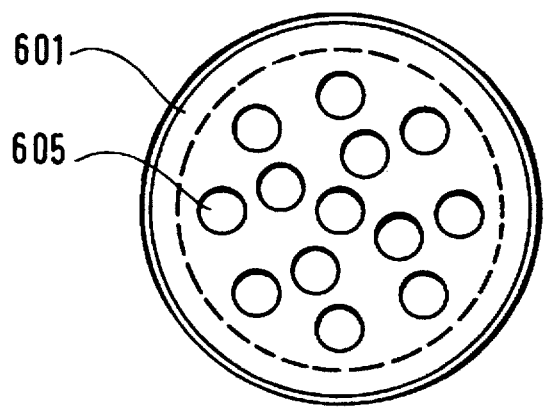
FIG. 4a shows a top view of the side away from the spinning rotor of a bearing plate according to the invention.

FIG. 4a also shows a bearing plate 601 of an open-end spinning device designed according to the invention, from the side away from the running surface 610. In it, the air channels 605 have smaller diameters and are much greater in number than in FIG. 3a. The air channels are located on two circular lines at equal distances and one of the air channels 605 is located in the center of the bearing plate. There are 13 air channels in the bearing plate of FIG. 4a.

Figure 4B:
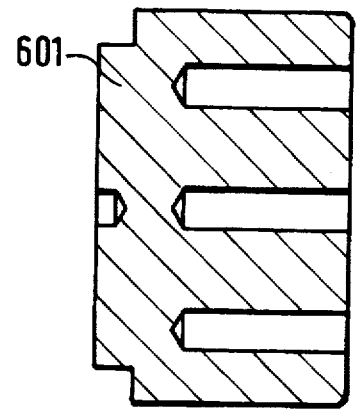
FIG. 4b shows the side view of the bearing plate of FIG. 4a, in a section.

As can be seen in FIG. 4b which shows a left side view of FIG. 6a in a section, the bearing plate 601 has no recess 606 such as the one of FIG. 3b. The air channels 605 are drilled into the bearing plate 601 directly from the end away from the spinning rotor. The air channels shown here ensure a very advantageous distribution of compressed air in the bearing gap thanks to their great number. The air channels are shown in the form of bores as an example. The invention is however not limited to this. The important point is the possibility for the compressed air to reach the close proximity of the bearing surface, whereby the air channel ensures in particular radial stability of the bearing plate.

FIG. 5a shows a top view of the side away from the spinning rotor of a bearing plate 601 according to the invention. The air channel 605 is provided with two ridges 608 which ensure greater radial stability of the air channel 605, since they are able to support pressure forces acting radially on the bearing plate 601, e.g. during its assembly.

The ridges 608 are offset by 90° relative to each other, so that they divide the channel cross-section of the air channels 605 into four parts of equal size. The ridges 608 can reach here as far as the end of the air channels 605 into the bearing plate 601. However they extend advantageously only over a partial axial area of the air channel 605 near its beginning which is away from the running surface. This makes it possible for the air to act upon the entire back of the running surface 610 (see e.g. FIG. 3b) whereby a uniform outflow of air from the running surface is achieved. A ridge or ridges designed in this manner may be also inserted into the channel plate, for example.

FIG. 5b shows a side view of a bearing plate 601 similar to the one of FIG. 5a, in a section. The bearing plate 601 has only one ridge in its air channel 605, contrary to the embodiment of FIG. 5a, and this ridge thus divides the air channel 605 into two equal parts. The ridge 608 extends axially into the air channel 605 up to the back 611 of the running surface 610 of the bearing plate 601. The area of the back 611 of the running surface 610 which is covered by the ridge is so small, relative to the running surface 610 that there is no substantial influence on the permeability of the bearing plate 601 to the air conveyed from air channel 605.

It should be apparent to those skilled in the art that various modifications and variations can be made in the invention without departing from the scope and spirit of the invention. It is intended that the present application cover such modifications and variations as come within the scope of the appended claims and their equivalents.

We claim:

1. An open-end spinning device with a spinning rotor having a shaft with a free end wherein an axially acting force is exerted on said spinning rotor towards said free end, said spinning device further comprising an axial aerostatic bearing disposed opposite said shaft free end so that a bearing gap is defined between said aerostatic bearing and said shaft free end, said aerostatic bearing comprising a bearing plate having a side facing said shaft free end and a side away from said shaft free end, said bearing plate formed of an air permeable material through which air travels through said side facing said shaft free end into said gap, said bearing plate further comprising at least one air channel defined through said face away from said shaft free end and extending into said bearing plate and ending at a distance of from about 0.5 to about 4.0 mm from said side facing said shaft free end, said channel connectable to a source of compressed air.

2. The spinning device as in claim 1, comprising at least three said channels.

3. The spinning device as in claim 1, further comprising a plurality of said channels, each said channel having a generally round cross-section with a diameter of from about 1.5 to about 5.0 mm.

4. The spinning device as in claim 3, wherein said channels have a longitudinal length of about 0.5 to about 5.0 mm.

5. The spinning device as in claim 1, further comprising a plurality of said channels disposed in a symmetric pattern in said face away from said shaft free end.

6. The spinning device as in claim 5, wherein said channels are arranged in a circular pattern around an axis of rotation of said spinning rotor.

7. The spinning device as in claim 1, comprising at least two said channels and at least one ridge separating said channels.

* * * * *